(12) United States Patent
Pan (10) Patent No.: US 8,325,447 B1
(45) Date of Patent: Dec. 4, 2012

(54) HEAD GIMBAL ASSEMBLY HAVING A LOAD BEAM APERATURE OVER CONDUCTIVE HEATING PADS THAT ARE OFFSET FROM HEAD BONDING PADS

(75) Inventor: Tzong-Shii Pan, San Jose, CA (US)

(73) Assignee: Western Digital Technologies, Inc., Irvine, CA (US)

(*) Notice: Subject to any disclaimer, the term of this patent is extended or adjusted under 35 U.S.C. 154(b) by 0 days.

(21) Appl. No.: 13/517,835

(22) Filed: Jun. 14, 2012

Related U.S. Application Data (62) Division of application No. 12/472,634, filed on May 27, 2009, now Pat. No. 8,218,268.

(51) Int. Cl.
*G11B 5/48* (2006.01)
(52) U.S. Cl. .................................... 360/245.9
(58) Field of Classification Search ............... 360/245.9
See application file for complete search history.

(56) References Cited

U.S. PATENT DOCUMENTS

| | | | |
|---|---|---|---|
| 4,761,699 A | 8/1988 | Ainslie et al. |
| 4,789,914 A | 12/1988 | Ainslie et al. |
| 5,530,604 A | 6/1996 | Pattanaik |
| 5,680,275 A | 10/1997 | Frater et al. |
| 5,808,834 A | 9/1998 | Jurgenson |
| 5,815,347 A | 9/1998 | Pattanaik |
| 5,896,248 A | 4/1999 | Hanrahan et al. |
| 6,125,014 A | 9/2000 | Riedlin, Jr. |
| 6,172,854 B1 | 1/2001 | Iwamoto |
| 6,282,063 B1 | 8/2001 | Coon |
| 6,349,017 B1 | 2/2002 | Schott |
| 6,351,354 B1 | 2/2002 | Bonin |
| 6,552,875 B1 | 4/2003 | Le et al. |
| 6,796,018 B1 | 9/2004 | Thornton |
| 6,920,014 B2 | 7/2005 | Sato et al. |
| 6,947,258 B1 | 9/2005 | Li |
| 7,006,330 B1 | 2/2006 | Subrahmanyam et al. |
| 7,307,816 B1 | 12/2007 | Thornton et al. |
| 2006/0044689 A1 | 3/2006 | Lille |
| 2007/0274005 A1 | 11/2007 | Zhu et al. |
| 2008/0170326 A1 | 7/2008 | Feng et al. |

FOREIGN PATENT DOCUMENTS

JP  54062949 A  5/1979

OTHER PUBLICATIONS

Notice of Allowance dated Mar. 16, 2012 from U.S. Appl. No. 12/472,634, 13 pages.
Shiraishi, "Chip on Suspension MR Head", IEMT/IMC Symposium, 2nd 1998, Apr. 15-17, 1998, pp. 333-336.

*Primary Examiner* — Jami M Valentine (57) ABSTRACT

A novel head gimbal assembly (HGA) for use in a disk drive is disclosed. Each of a plurality of electrically conductive traces of a flexure of the HGA includes a connection region that is aligned with and connected to a corresponding one of a plurality of electrically conductive bonding pads of a head. Each of the plurality of electrically conductive traces further includes a heating pad that is offset from its connection region by an offset distance. A dielectric layer of the flexure includes a first opening over the heating pad, a support layer of the flexure includes a second opening over the heating pad, and a load beam of the HGA includes a third opening disposed over the heating pad. During assembly, light may be shined through the openings and onto the heating pad until solder located in the connection region that is offset from the heating pad melts.

7 Claims, 7 Drawing Sheets

HEAD GIMBAL ASSEMBLY HAVING A LOAD BEAM APERATURE OVER CONDUCTIVE HEATING PADS THAT ARE OFFSET FROM HEAD BONDING PADS

CROSS REFERENCE TO RELATED APPLICATIONS

This application is a divisional of U.S. patent application Ser. No. 12/472,634, filed on May 27, 2009, which is hereby incorporated by reference in its entirety.

BACKGROUND OF THE INVENTION

1. Field of the Invention

The present invention relates generally to the field of information storage devices, and more particularly to head gimbal assemblies used in information storage devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head gimbal assembly (HGA). The head typically includes a slider and a read/write transducer. The HGA typically also includes a suspension assembly with a laminated flexure to carry the electrical signals to and from the head. The HGA, in turn, is a sub-component of a head stack assembly (HSA) that typically includes a plurality of HGAs, an actuator, and a flex cable. The plurality of HGAs are attached to various arms of the actuator, and each of the laminated flexures of the HGAs has a flexure tail that is electrically connected to the HSA's flex cable.

Modern laminated flexures typically include electrically conductive copper traces that are isolated from a stainless steel support layer by a polyimide dielectric layer. So that the signals from/to the head can reach the flex cable on the actuator body, each HGA flexure includes a flexure tail that extends away from the head along the actuator arm and ultimately attaches to the flex cable adjacent the actuator body. That is, the flexure includes electrically conductive traces that extend from adjacent the head and terminate at electrical connection points at the flexure tail. At the other end, the electrically conductive traces are electrically connected to a plurality of electrically conductive bonding pads on the head.

The industry trend towards increasing areal data density has necessitated, for certain disk drive products, that additional features (e.g. a microactuator for fine tracking control and/or a heater for flying height actuation) be added to the head. In such products, it becomes necessary to electrically connect more bonding pads per head. However, the head cannot be made larger to accommodate the additional bonding pads; on the contrary, heads have become smaller for various important reasons (e.g. cost, dynamic response to mechanical shock, etc) and such trend is unlikely to reverse. Accordingly, there is a need in the art for HGA designs that can facilitate the practical electrical connection of conductive traces of the flexure to more and/or smaller bonding pads on the head.

SUMMARY

A novel head gimbal assembly (HGA) for use in a disk drive is disclosed, according to an aspect of the present invention. The head gimbal assembly includes a load beam and a laminated flexure attached to the load beam. The laminated flexure includes a support layer, a dielectric layer, and an electrically conductive layer. A plurality of electrically conductive traces is defined in the electrically conductive layer. The dielectric layer is disposed between the support layer and the electrically conductive layer. A head is attached to the laminated flexure. The head includes a plurality of electrically conductive bonding pads. Each of the plurality of electrically conductive traces includes a connection region that is aligned with and connected to a corresponding one of the plurality of electrically conductive bonding pads. Each of the plurality of electrically conductive traces further includes a heating pad that is offset from its connection region by an offset distance. The dielectric layer includes a first opening over the heating pad, the support layer includes a second opening over the heating pad, and the load beam includes a third opening disposed over the heating pad.

A novel method to attach a head to a laminated flexure in a head gimbal assembly (HGA) for use in a disk drive is also disclosed, according to another aspect of the present invention. The head is positioned with respect to the laminated flexure so that a plurality of conductive bonding pads of the head are aligned with a plurality of electrically conductive traces of the laminated flexure. Light is shined through at least one opening in a load beam of the HGA and onto a heating pad of at least one of the plurality of electrically conductive traces, until solid solder located in a connection region that is offset from the heating pad melts and joins the at least one of the plurality of electrically conductive traces to a corresponding one of the plurality of conductive bonding pads. The solder is allowed to solidify in the connection region, to form a solid electrical connection in the connection region between the at least one of the plurality of electrically conductive traces and the corresponding one of the plurality of conductive bonding pads. The at least one of the plurality of conductive traces is not exposed to the light in the connection region. The corresponding one of the plurality of conductive bonding pads is also not exposed to the light.

DETAILED DESCRIPTION OF EXEMPLARY EMBODIMENTS

Figure 1:
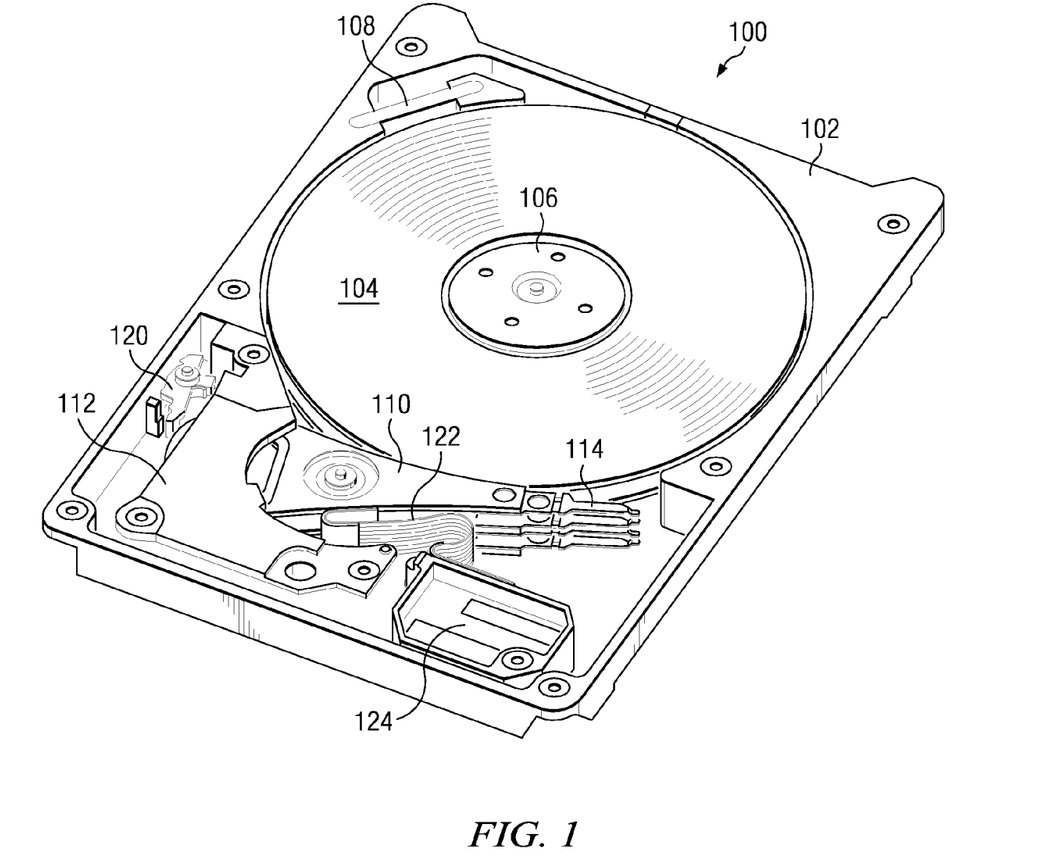
FIG. 1 is a top perspective view of a disk drive capable of incorporating an embodiment of the present invention.

FIG. 1 is top perspective view of a disk drive 100 capable of including an embodiment of the present invention. The disk drive 100 includes a disk drive base 102 and two annular magnetic disks 104. The disk drive 100 further includes a spindle 106, rotably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 110 that is rotably mounted on disk drive base 102. Voice coil motor 112 rotates the actuator 110 through a limited angular range so that at least one head gimbal assembly (HGA) is desirably positioned relative to one or more tracks of information on a corresponding one of the disks 104. The embodiment of FIG. 1 includes four HGAs 114, each of which corresponds to a surface of one of the two disks 104. However in other embodiments fewer or more HGAs may be included depending on the number of disks 104 that are included and whether the disk drive 100 is depopulated. Each HGA 114 includes a head (not depicted in FIG. 1) for reading and writing data from and to one of the disks 104. The actuator 110 may occasionally be latched at an extreme angular position within the limited angular range, by latch 120. Electrical signals to/from the HGAs 114 are carried to other drive electronics via a flex cable 122 and flex cable bracket 124.

Figure 2:
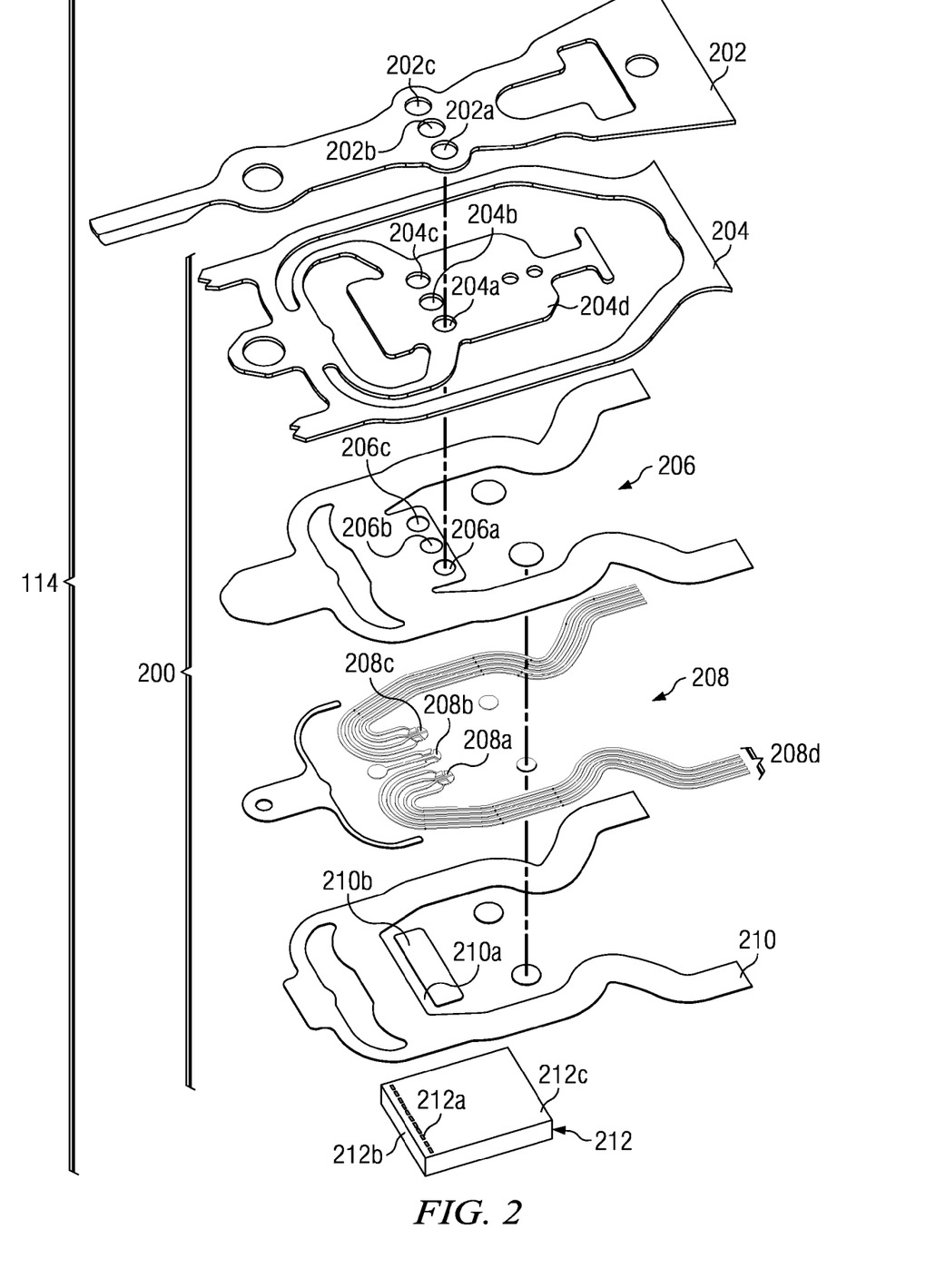
FIG. 2 is an exploded perspective view of the distal end of an HGA according to an embodiment of the present invention.

FIG. 2 is an exploded perspective view of the distal end of an HGA 114 according to an embodiment of the present invention. The HGA 114 includes load beam 202 and a head 212. The head 212 includes an air bearing surface (not visible in the view of FIG. 2 because it is the underside in this view), a trailing face 212*b* that is substantially orthogonal to the air bearing surface and that includes a read transducer (too small to be seen in the view of FIG. 2), and a backside face 212*c* that is substantially parallel and opposite to the air bearing surface. In the embodiment of FIG. 2, the backside face 212*c* includes the plurality of electrically conductive bonding pads 212*a*. The purpose of the load beam 202 is to provide vertical compliance for the head 212 to follow vertical undulation of the surface of the disk 104 as it rotates, and to preload air bearing surface of the head 212 against the surface of the disk 104 as it rotates, by a preload force that is commonly referred to as the "gram load."

The HGA 114 also includes a laminated flexure 200 attached to the load beam 202. The head 212 is attached to a tongue 204*d* of the laminated flexure 200. A first purpose of the laminated flexure 200 is to provide compliance for the head 212 to follow pitch and roll angular undulations of the surface of disk 104 as it rotates, while restricting relative motion between the head 212 and the load beam 202 in the lateral direction and about a yaw axis. A second purpose of the laminated flexure 200 is to provide a plurality of electrical paths 208*d* to the plurality of electrically conductive bonding pads 212*a* of the head 212, to facilitate signal transmission to/from the head 212.

For that second purpose, the laminated flexure 200 includes a plurality of electrically conductive traces 208*d* that are defined in an electrically conductive layer 208, and that are isolated from a support layer 204 by a dielectric layer 206 that is disposed between the support layer 204 and the electrically conductive layer 208. For example, the conductive traces 208*d* may comprise copper, the support layer 204 may comprise stainless steel and/or another suitable structural material, and the dielectric layer 206 may comprise polyimide. In certain embodiments, the electrically conductive layer 208 comprises a copper layer having a thickness that is at least 5 microns but no more than 15 microns. In various regions of the laminated flexure 200, one or more of the layers may be absent (e.g. removed by etching).

Figure 3:
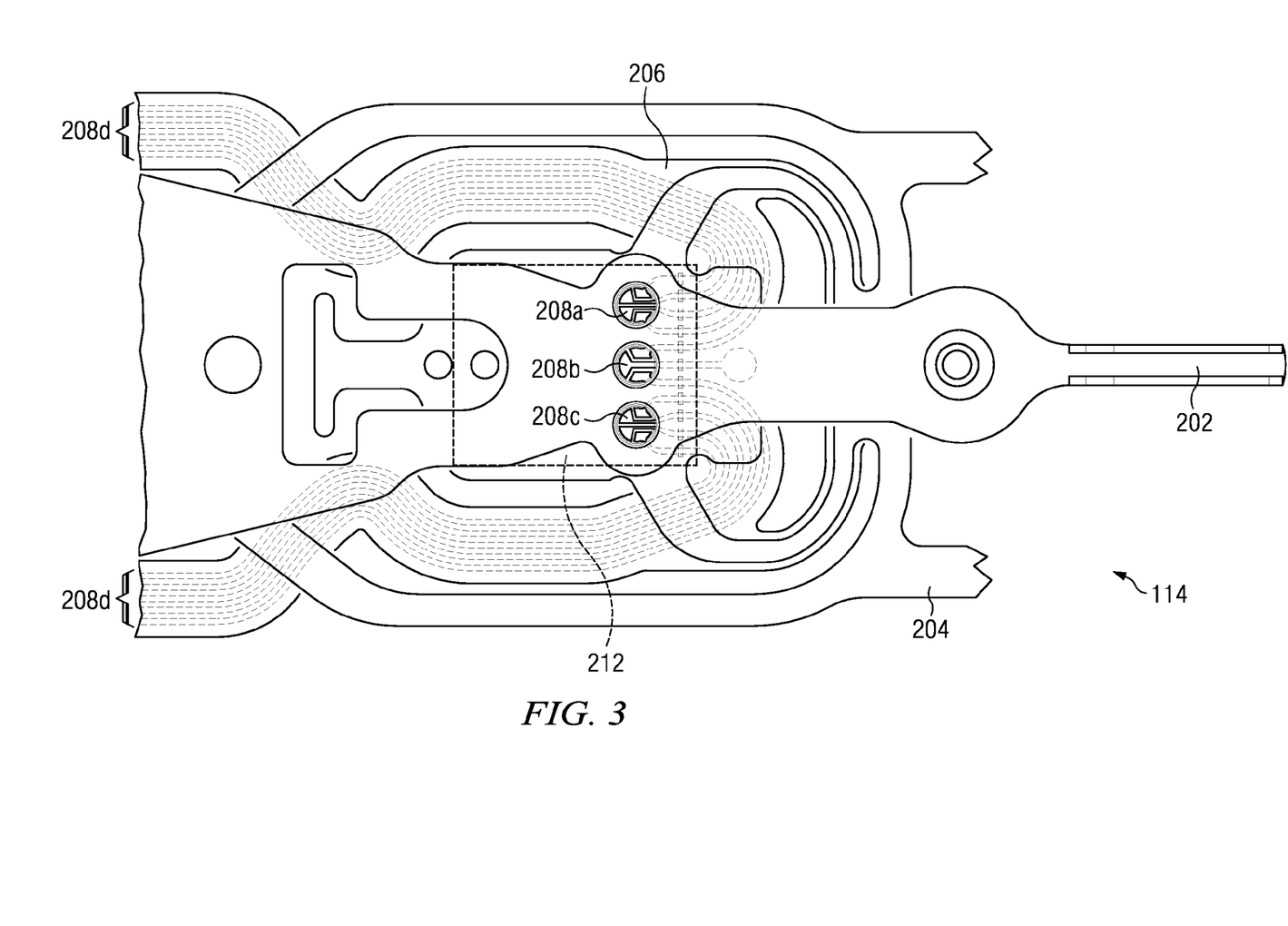
FIG. 3 is a top view of the distal end of an HGA according to an embodiment of the present invention.
Figure 4:
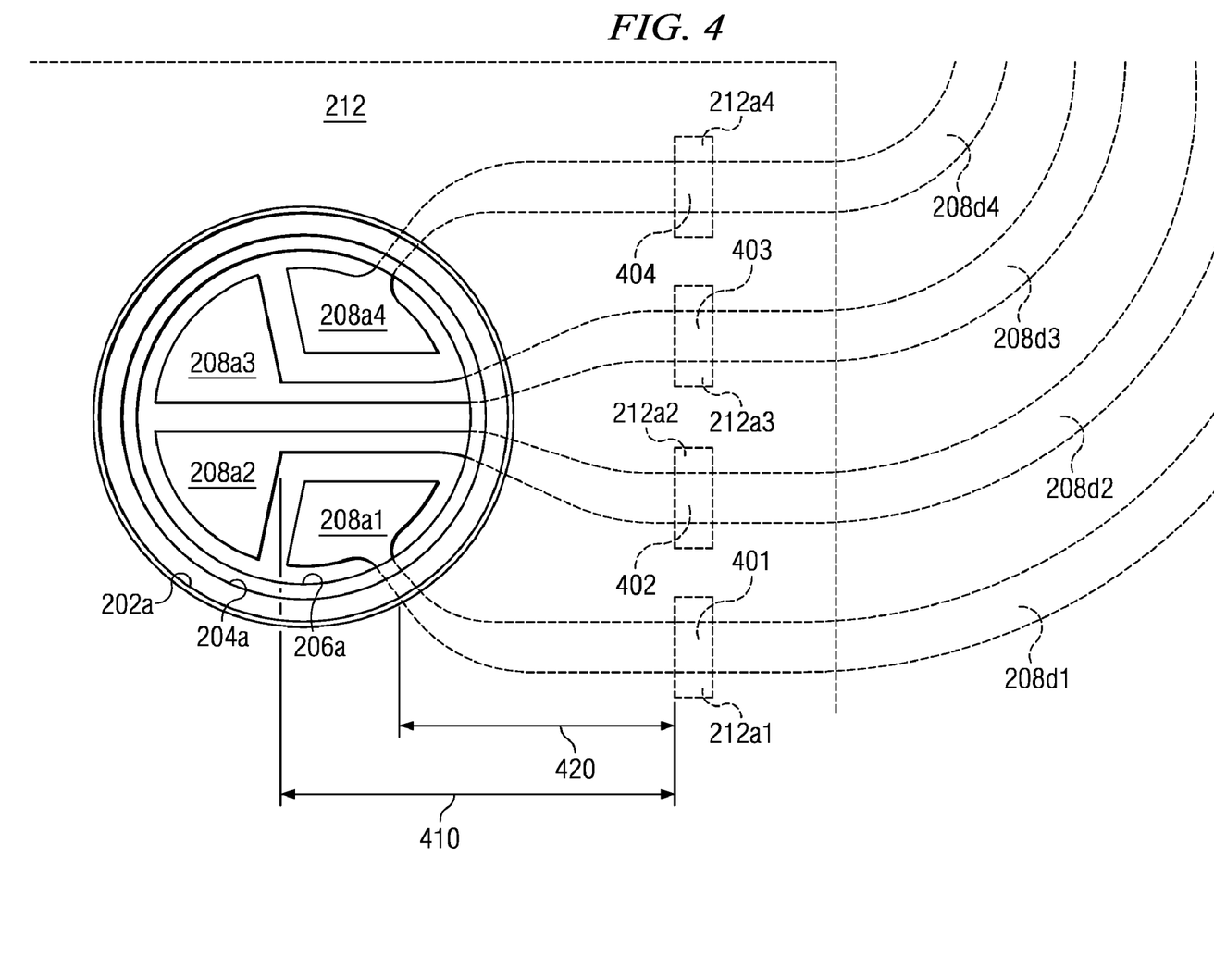
FIG. 4 is top view of a plurality of heating pads and connection regions, according to an embodiment of the present invention.

The electrical connection of the plurality of electrically conductive traces 208*d* of the flexure 200, with the plurality of electrically conductive bonding pads 212*a* of the head 212, is now further described referring additionally to FIGS. 3 and 4. FIG. 3 is a top view of the distal end of the HGA 114. In the embodiment of FIG. 3, heating pads in three clusters 208*a*, 208*b*, and 208*c*, are defined in the electrically conductive layer 208, and can be seen through openings 202*a*, 202*b*, and 202*c* in the load beam 202, openings 204*a*, 204*b*, and 204*c* in the support layer 204, and openings 206*a*, 206*b*, and 206*c* in the dielectric layer 206.

Although the openings 202*a*, 202*b*, 202*c*, 204*a*, 204*b*, 204*c*, 206*a*, 206*b*, and 206*c* are depicted as being circular holes having a closed interior contour, such openings may include any absence of the corresponding layer material over the heating pad(s), whether it be a defined and bounded aperture in the layer that is the same size or larger than the heating pad(s), or whether it be that the layer material is etched away everywhere in a larger (and possibly unbounded) region that overlies the heating pad(s).

Due to the wafer fabrication methods employed to produce the head 212, it may not be practical to arrange the electrically conductive bonding pads 212*a* in clusters; rather, the electrically conductive bonding pads 212*a* may need to be arranged in a line. However, in the embodiment of FIG. 3, the heating pads are still preferably arranged in distinct clusters (rather than being aligned as are the electrically conductive bonding pads 212*a* of the head 212). Otherwise, one wide opening through the load beam 202 might be required to provide access for heating by a laser to facilitate bonding (rather than three smaller openings). Such a wide opening might unacceptably structurally weaken the load beam 202, unless the load beam were made substantially wider at the location of the opening—which, in turn, might unacceptably increase the mass and inertia of the load beam 202. Accordingly, in the embodiment of FIG. 3, an inter-cluster spacing (between the clusters) exceeds an inter-pad spacing (between any two heating pads of the same cluster).

In the embodiment of FIGS. 2-3, each of the plurality of electrically conductive traces 208*d* that extends from one of the heating pads in the clusters 208*a*, 208*b*, and 208*c*, is aligned with and crosses over a corresponding one of the plurality of electrically conductive bonding pads 212*a* of the head 212. The area of overlap of each of the plurality of electrically conductive traces 208*d* with a corresponding one of the plurality of electrically conductive bonding pad 212*a*, is referred to as the connection region of that electrically conductive trace 208*d*.

For example, now referring additionally to FIG. 4, electrically conductive trace 208*d*1 includes a heating pad 208*a*1 (in the cluster 208*a*) that is offset by an offset distance 420 from a connection region 401. The electrically conductive trace 208*d*1 is aligned with and connected to the electrically conductive bonding pad 212*a*1 (of the plurality of bonding pads 212*a* of the head 212) at the connection region 401. Similarly, electrically conductive trace 208*d*2 includes a heating pad 208*a*2 (in the cluster 208*a*) that is offset by an offset distance 410 from a connection region 402. The electrically conductive trace 208*d*2 is aligned with and connected to the electrically conductive bonding pad 212*a*2 (of the plurality of bonding pads 212*a* of the head 212) at the connection region 402. Also, electrically conductive trace 208*d*3 includes a heating pad 208*a*3 (in the cluster 208*a*) that is offset by the offset distance 410 from a connection region 403. The electrically conductive trace 208*d*3 is aligned with and connected to the electrically conductive bonding pad 212*a*3 (of the plurality of bonding pads 212*a* of the head 212) at the connection region 403. Likewise, electrically conductive trace 208d4 includes a heating pad 208a4 (in the cluster 208a) that is offset by the offset distance 420 from a connection region 404. The electrically conductive trace 208d4 is aligned with and connected to the electrically conductive bonding pad 212a4 (of the plurality of bonding pads 212a of the head 212) at the connection region 404.

In the embodiment of FIG. 4, the offset distances 410 and 420 are preferably in the range 40 µm to 400 µm. A minimum distance of 40 µm is preferred in this embodiment to enable, geometrically, a practical limit to the variation in distance between the various heating pads and the corresponding connection regions of the electrically conductive traces. By limiting the relative variation in distance from the connection regions to their heating pads, temperature variation among the connection regions during heating may also be limited. The offset distances 410 and 420 are preferably limited to a maximum of 400 µm in the embodiment of FIG. 4, so that the required temperature rise of the heating pads (for bonding at the connection regions) may be practical and convenient in terms of heating power and heating time for a high-volume manufacturing environment.

Furthermore, the relative sizes (i.e. total heating areas) of the heating pads may be adjusted to enhance the uniformity of temperature among the connection regions. For example, in the embodiment of FIG. 4, heating pad 208a2 is optionally designed to be larger than heating pad 208a1, because heating pad 208a2 is disposed further away from connection region 402 than heating pad 208a1 is from connection region 401. Otherwise, because heating pad 208a2 is disposed further away from connection region 402 than heating pad 208a1 is from connection region 401, the connection region 402 may not get as hot during laser heating as the connection region 401. To reduce that temperature difference and thereby enhance temperature uniformity, the total heating area of heating pad 208a2 optionally can be made larger than the total heating area of heating pad 208a1. Likewise, in the embodiment of FIG. 4, heating pad 208a3 is optionally designed to be larger than heating pad 208a4, which may enhance temperature uniformity at the connection regions because heating pad 208a3 is disposed further away from connection region 403 than heating pad 208a4 is from connection region 404.

As can be seen in FIG. 2, portions of the electrically conductive layer 208 may also optionally be coated with an insulative cover layer 210 (e.g. a polymer layer). A region 210b of the cover layer 210 preferably covers the heating pads on a side of the electrically conductive layer 208 that is opposite the dielectric layer 206, for example to help provide a backing to the heating pads so that they may maintain their relative orientation during assembly (while still allowing the heating pads to remain exposed to laser heating through the openings in the dielectric layer 206). Also in the embodiment of FIG. 2, the cover layer 210 includes an opening 210a over the electrically conductive bonding pads 212a (and therefore over the connection regions 401-404 shown in FIG. 4) to prevent the insulative cover layer 210 from interfering with the electrical connection of the electrically conductive traces 208d and the electrically conductive bonding pads 212a. Note that in the embodiment of FIG. 2 the periphery of the opening 210a has an open contour (as opposed to the closed interior contour of the opening 206a in the dielectric layer 206).

An example method to assemble the HGA 114 may be described with reference to FIGS. 2-4 as follows. The head 212 may be positioned with respect to the laminated flexure 200 so that the plurality of conductive bonding pads 212a of the head 212 are aligned with the plurality of electrically conductive traces 208d of the laminated flexure 200. Light may be shined through one or more of the openings 202a,b,c in the load beam 202, and onto the heating pad clusters 208a,b,c of the plurality of electrically conductive traces 208d, until solid solder located in the connection regions 401-404 (that are offset from the heating pads) melts and joins the electrically conductive traces 208d to the corresponding conductive bonding pads 212a. In certain embodiments, the solid solder located in the connection regions 401-404 may take the form of solder plating or solder bumps that are attached to the plurality of electrically conductive traces 208d in the connection regions 401-404. In certain alternative embodiments, the solid solder located in the connection regions 401-404 may take the form of solder plating or solder bumps that are attached to the plurality of conductive bonding pads 212a.

In certain embodiments, the light heats the heating pads to a temperature that is preferably at least 220° C. but preferably no more than 400° C. The minimum temperature in such embodiments is preferably high enough that the connection regions reach the melting temperature of solder. The maximum temperature in such embodiments is preferably lower than the temperature that could damage the cover layer or dielectric layer material (e.g. polymide). In certain embodiments, such heating pad temperatures might be practically achieved in a high-volume manufacturing environment by an ultraviolet light source, but in many embodiments it is preferably achieved by the rapid application of a heating laser. In certain embodiments, for example, the heating pads may be exposed to a heating laser power of 200 mW for a heating time of less than one second. Such laser power may be provided by a 300-500 nm wavelength blue laser having a focus spot size of approximately 100 microns, for example.

Note that according to this example method, the conductive traces 208d were not directly exposed to the light in the connection regions 401-404, and neither were the corresponding conductive bonding pads 212a. However, it is contemplated that an HGA may be designed to allow such exposure, consistent with a method of the present invention (for example, if additional openings were made in the various layers of the flexure for such purpose or incidentally).

The solder may then be allowed to solidify in the connection regions 401-404, to form solid electrical connections there, between the plurality of electrically conductive traces 208d and the corresponding conductive bonding pads 212a.

Figure 5:
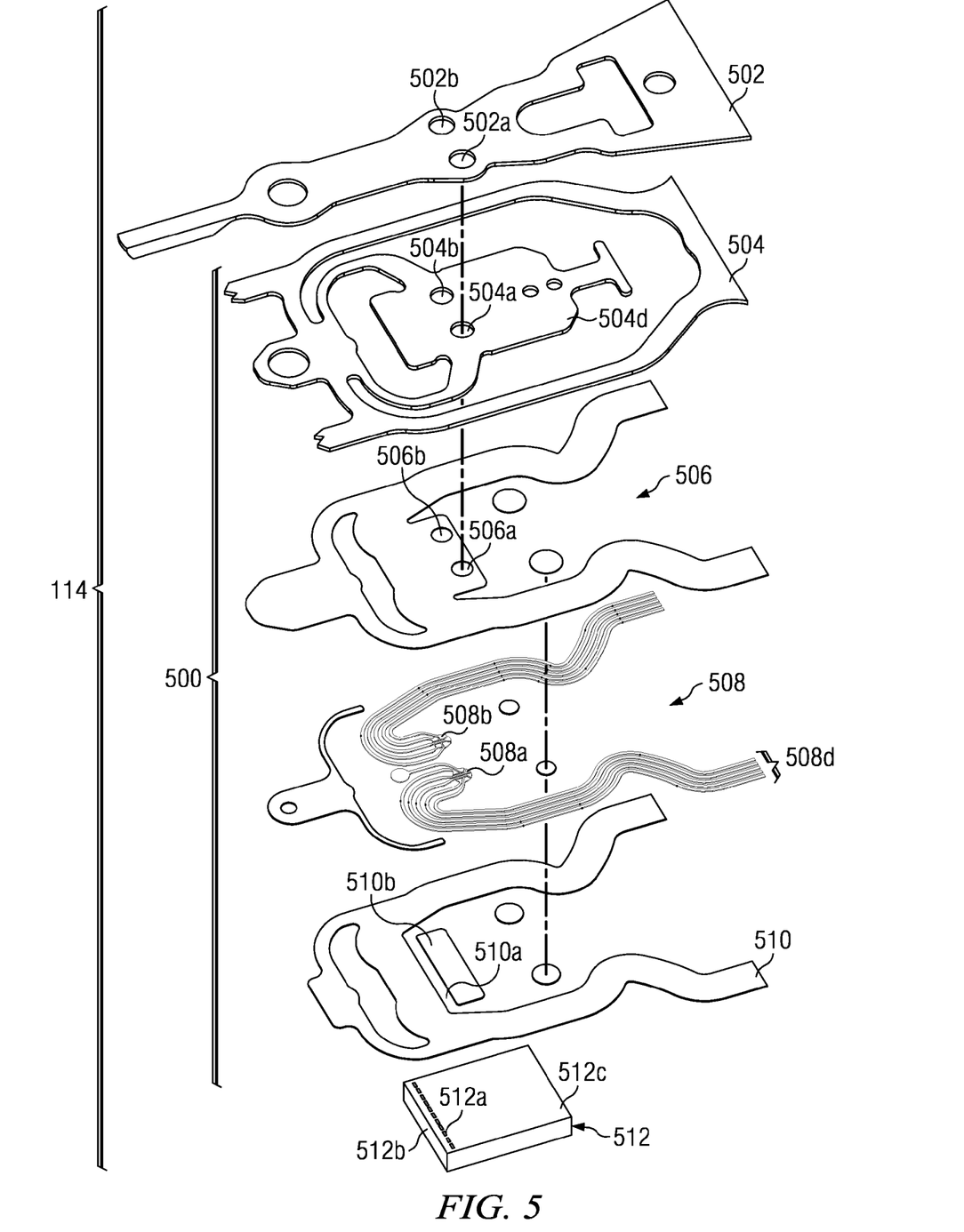
FIG. 5 is an exploded perspective view of the distal end of an HGA according to another embodiment of the present invention.

FIG. 5 is an exploded perspective view of the distal end of an HGA 114 according to another embodiment of the present invention. The HGA 114 includes load beam 502 and a head 512. The head 512 includes an air bearing surface (not visible in the view of FIG. 5 because it is the underside in this view), a trailing face 512b that is substantially orthogonal to the air bearing surface and that includes a read transducer (too small to be seen in the view of FIG. 5), and a backside face 512c that is substantially parallel and opposite to the air bearing surface. In the embodiment of FIG. 5, the backside face 212c includes the plurality of electrically conductive bonding pads 512a.

The HGA 114 of FIG. 5 also includes a laminated flexure 500 attached to the load beam 502. The head 512 is attached to a tongue 504d of the laminated flexure 500. A first purpose of the laminated flexure 500 is to provide compliance for the head 512 to follow pitch and roll angular undulations of the surface of disk 104 as it rotates, while restricting relative motion between the head 512 and the load beam 502 in the lateral direction and about a yaw axis. A second purpose of the laminated flexure 500 is to provide a plurality of electrical paths 508d to the plurality of electrically conductive bonding pads 512a of the head 512, to facilitate signal transmission to/from the head 512.

For that second purpose, the laminated flexure 500 includes a plurality of electrically conductive traces 508d that are defined in an electrically conductive layer 508, and that are isolated from a support layer 504 by a dielectric layer 506 that is disposed between the support layer 504 and the electrically conductive layer 508. For example, the conductive traces 508d may comprise copper, the support layer 504 may comprise stainless steel and/or another suitable structural material, and the dielectric layer 506 may comprise polyimide. In certain embodiments, the electrically conductive layer 508 comprises a copper layer having a thickness that is at least 5 microns but no more than 15 microns. In various regions of the laminated flexure 500, one or more of the layers may be absent (e.g. removed by etching).

Figure 6:
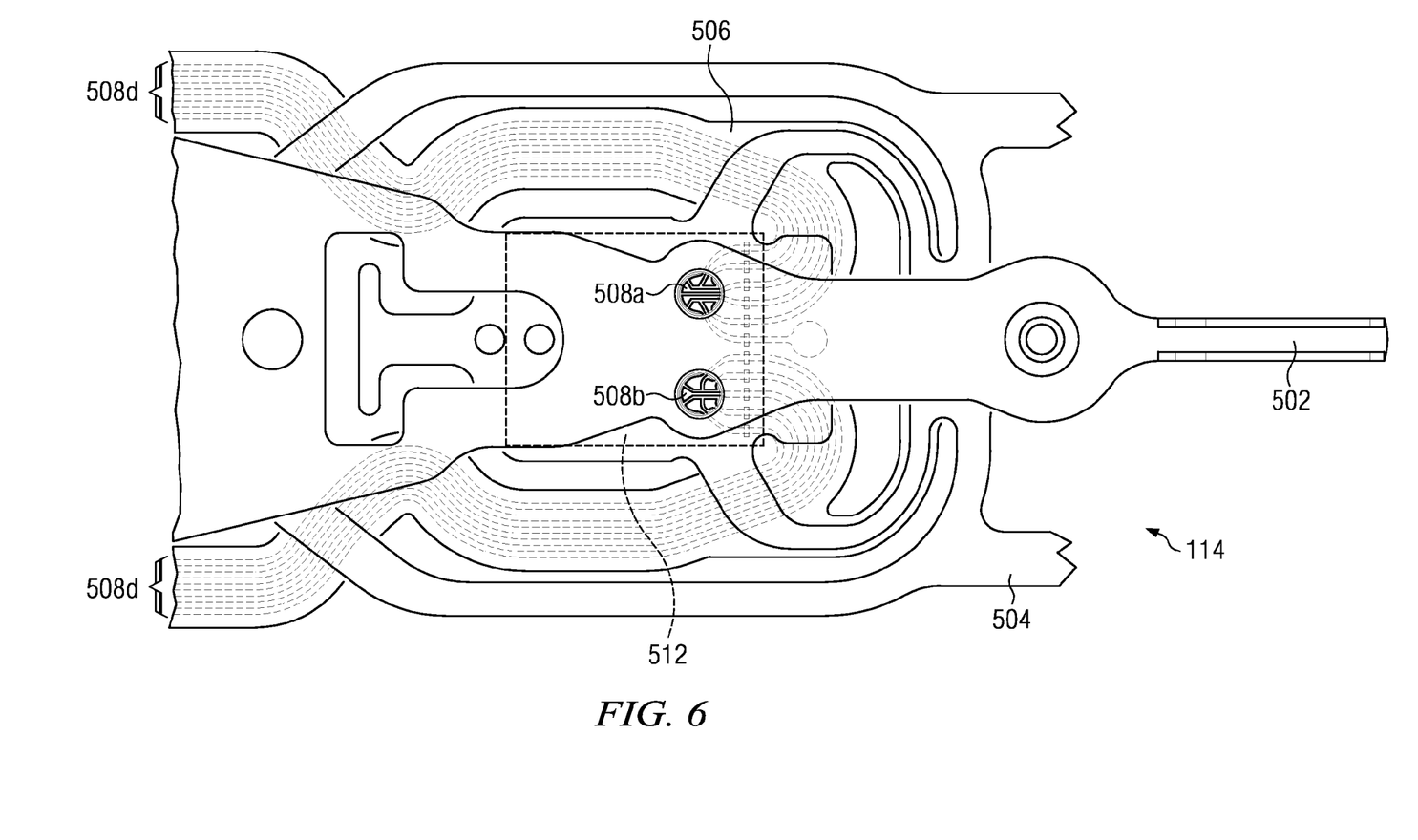
FIG. 6 is a top view of the distal end of an HGA according to an embodiment of the present invention.
Figure 7:
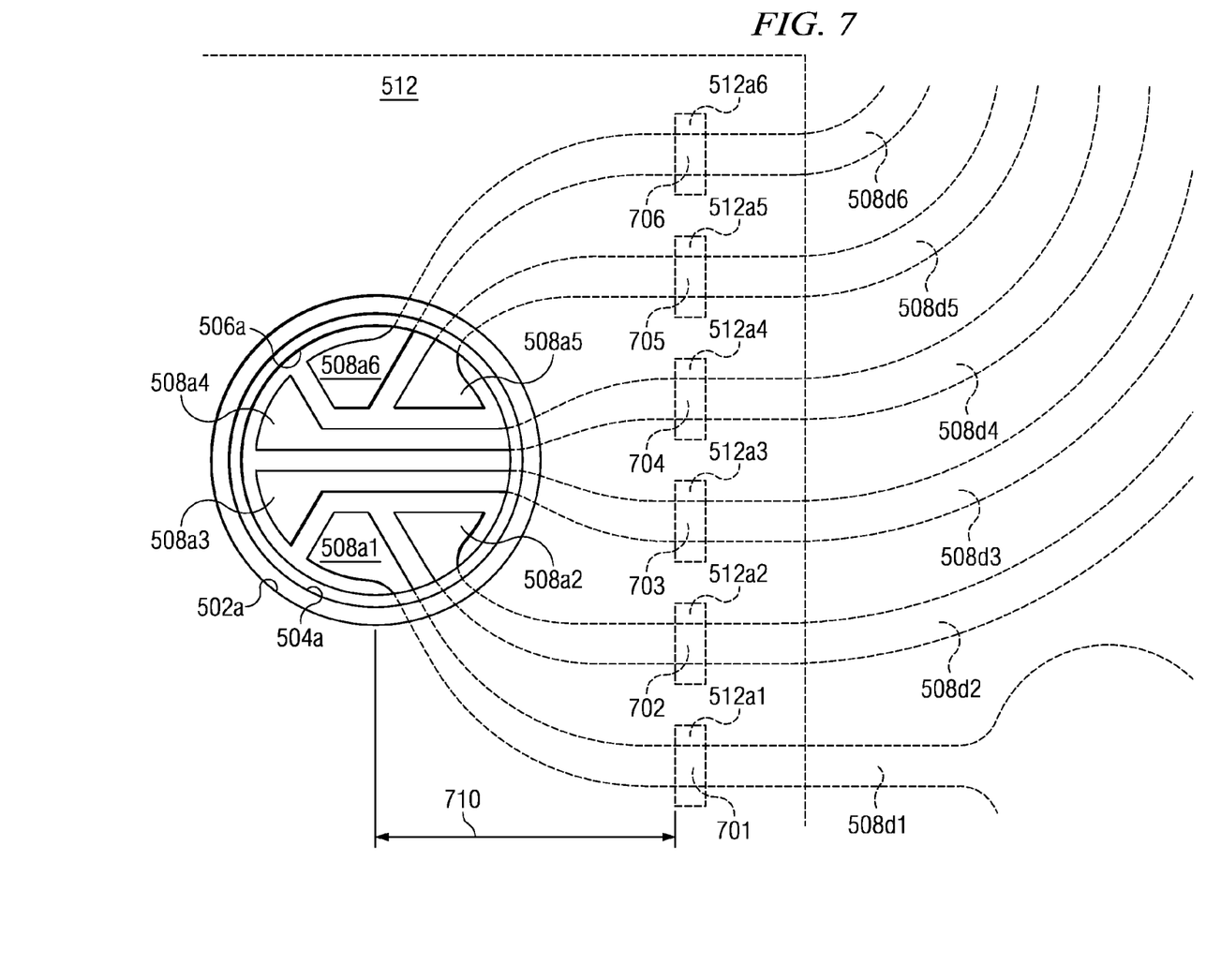
FIG. 7 is top view of a plurality of heating pads and connection regions, according to an embodiment of the present invention.

The electrical connection of the plurality of electrically conductive traces 508d of the flexure 500, with the plurality of electrically conductive bonding pads 512a of the head 512, is now further described referring additionally to FIGS. 6 and 7. FIG. 6 is a top view of the distal end of the HGA. In the embodiment of FIG. 6, heating pads in two clusters 508a, and 508b, are defined in the electrically conductive layer 508, and can be seen through openings 502a and 502b in the load beam 502, openings 504a and 504b in the support layer 504, and openings 506a and 506b in the dielectric layer 506.

Although the openings 502a, 502b, 504a, 504b, 506a, and 506b are depicted as being circular holes having a closed interior contour, such openings may include any absence of the corresponding layer material over the heating pad(s), whether it be a defined and bounded aperture in the layer that is the same size or larger than the heating pad(s), or whether it be that the layer material is etched away everywhere in a larger (and possibly unbounded) region that overlies the heating pad(s).

Due to the wafer fabrication methods employed to produce the head 512, it may not be practical to arrange the electrically conductive bonding pads 512a in clusters; rather, the electrically conductive bonding pads 512a may need to be arranged in a line. However, in the embodiment of FIG. 6, the heating pads are still preferably arranged in distinct clusters (rather than being aligned as are the electrically conductive bonding pads 512a of the head 512). Otherwise, one wide opening through the load beam 502 might be required to provide access for heating by a laser to facilitate bonding (rather than two smaller openings). Such a wide opening might unacceptably structurally weaken the load beam 502, unless the load beam were made substantially wider at the location of the opening—which, in turn, might unacceptably increase the mass and inertia of the load beam 502. Accordingly, in the embodiment of FIG. 6, an inter-cluster spacing (between the two clusters) exceeds an inter-pad spacing (between any two heating pads of the same cluster).

In the embodiment of FIGS. 5-6, each of the plurality of electrically conductive traces 508d that extends from one of the heating pads in the clusters 508a and 508b, is aligned with and crosses over a corresponding one of the plurality of electrically conductive bonding pads 512a of the head 512. The area of overlap of each of the plurality of electrically conductive traces 508d with a corresponding one of the plurality of electrically conductive bonding pad 512a, is referred to as the connection region of that electrically conductive trace 508d.

For example, now referring additionally to FIG. 7, electrically conductive trace 508d1 includes a heating pad 508a1 (in the cluster 508a) that is offset by an offset distance 710 from a connection region 701. The electrically conductive trace 508d1 is aligned with and connected to the electrically conductive bonding pad 512a1 (of the plurality of bonding pads 512a of the head 512) at the connection region 701. Similarly, electrically conductive traces 508d2, 508d3, 508d4, 508d5, and 508d6 each includes a heating pad 508a2, 508a3, 508a4, 508a5, and 508a6, (in the cluster 508a) respectively, and is each aligned with and connected to the electrically conductive bonding pads 512a2, 512a3, 512a4, 512a5, and 512a6, (of the plurality of bonding pads 512a of the head 512) respectively, at the connection regions 702, 703, 704, 705, and 706, respectively.

In the embodiment of FIG. 7, the offset distance 710 is preferably in the range 40 μm to 400 μm. A minimum distance of 40 μm is preferred in this embodiment to enable, geometrically, a practical limit to the variation in distance between the various heating pads and the corresponding connection regions of the electrically conductive traces. By limiting the relative variation in distance from the connection regions to their heating pads, temperature variation among the connection regions during heating may also be limited. The offset distance 710 is preferably limited to a maximum of 400 μm in the embodiment of FIG. 7, so that the required temperature rise of the heating pads (for bonding at the connection regions) may be practical and convenient in terms of heating power and heating time for a high-volume manufacturing environment.

As can be seen in FIG. 5, portions of the electrically conductive layer 508 may also optionally be coated with an insulative cover layer 510 (e.g. a polymer layer). A region 510b of the cover layer 510 preferably covers the heating pads on a side of the electrically conductive layer 508 that is opposite the dielectric layer 506, for example to help provide a backing to the heating pads so that they may maintain their relative orientation during assembly (while still allowing the heating pads to remain exposed to laser heating through the openings in the dielectric layer 506). Also in the embodiment of FIG. 5, the cover layer 510 includes an opening 510a over the electrically conductive bonding pads 512a (and therefore over the connection regions 701-706 shown in FIG. 7) to prevent the insulative cover layer 510 from interfering with the electrical connection of the electrically conductive traces 508d and the electrically conductive bonding pads 512a. Note that in the embodiment of FIG. 5 the periphery of the opening 510a has an open contour (as opposed to the closed interior contour of the opening 506a in the dielectric layer 506).

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A method to attach a head to a laminated flexure in a head gimbal assembly (HGA) for use in a disk drive, the method comprising:

positioning the head with respect to the laminated flexure so that a plurality of conductive bonding pads of the head are aligned with a plurality of electrically conductive traces of the laminated flexure;

shining light through at least one opening in a load beam of the HGA and onto a heating pad of at least one of the plurality of electrically conductive traces, until solid solder located in a connection region that is offset from the heating pad melts and joins the at least one of the plurality of electrically conductive traces to a corresponding one of the plurality of conductive bonding pads; and allowing the solder to solidify in the connection region, to form a solid electrical connection in the connection region between the at least one of the plurality of electrically conductive traces and the corresponding one of the plurality of conductive bonding pads;

wherein the at least one of the plurality of conductive traces is not exposed to the light in the connection region, and wherein the corresponding one of the plurality of conductive bonding pads is also not exposed to the light.

2. The method of claim 1, wherein the heating pad is heated to a temperature of at least 220° C. but no more than 400° C.

3. The method of claim 1, wherein the light is ultraviolet light.

4. The method of claim 1, wherein the light is laser light.

5. The method of claim 1, wherein the solid solder is a solder bump attached to the at least one of the plurality of electrically conductive traces, in the connection region.

6. The method of claim 1, wherein the solid solder is a solder bump attached to the corresponding one of the plurality of conductive bonding pads.

7. The method of claim 1, wherein the light is also shone through openings in a support layer and in a dielectric layer of the laminated flexure.

\* \* \* \* \*